UNITED STATES PATENT OFFICE.

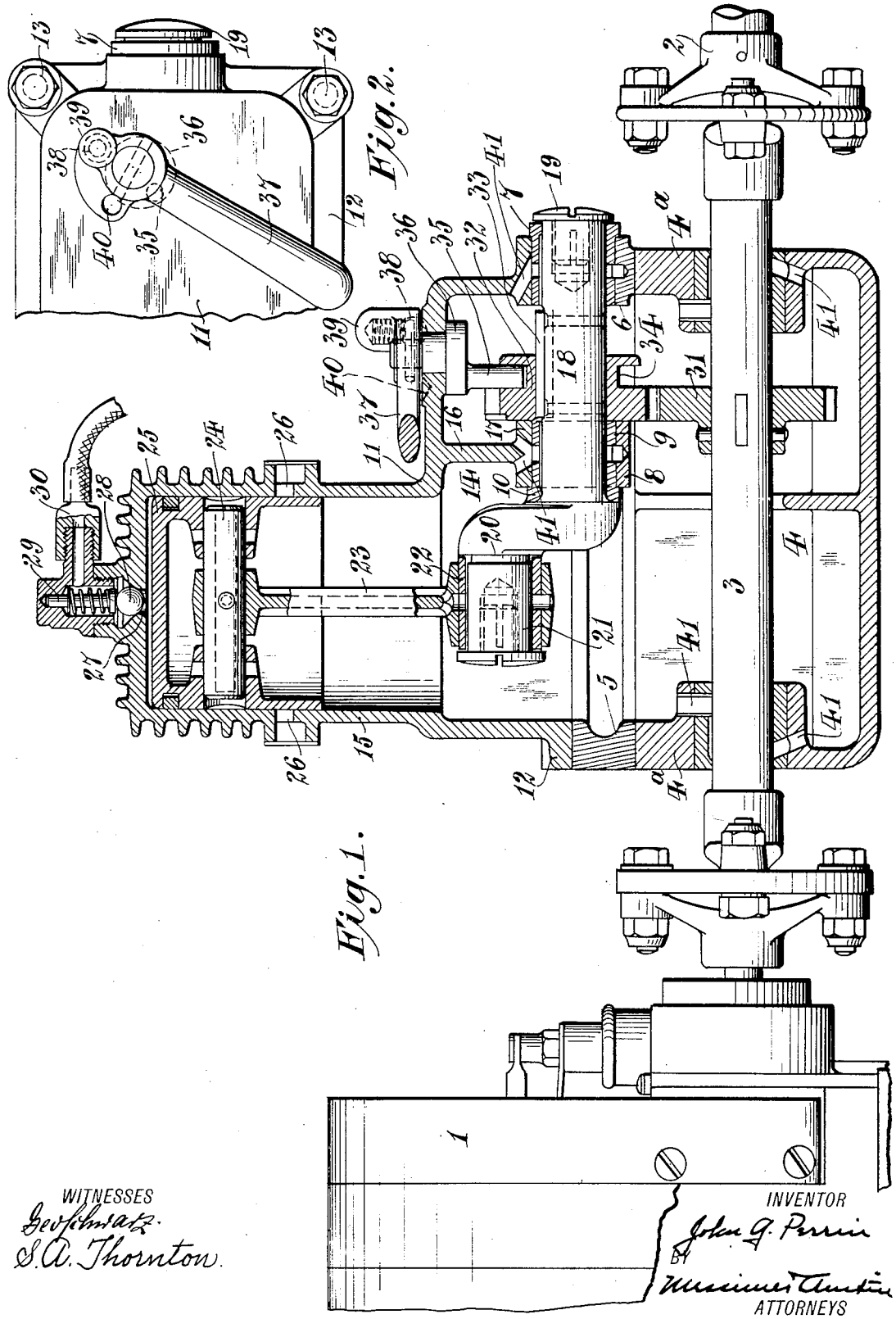

JOHN G. PERRIN, OF DETROIT, MICHIGAN.

AUTOMOBILE-PUMP.

1,389,782. Specification of Letters Patent. Patented Sept. 6, 1921.

Application filed July 16, 1914, Serial No. 851,258. Renewed April 9, 1920. Serial No. 372,717.

*To all whom it may concern:*

Be it known that I, JOHN G. PERRIN, a citizen of the United States, and resident of Detroit, in the county of Wayne and State of Michigan, have invented certain new and useful Improvements in Automobile-Pumps, of which the following is a specification.

My invention relates to an air pump forming an integral part of an automobile engine and used for inflating the vehicle tires.

Among the objects of the invention are to provide a compact and neat assemblage of tire pump elements with a part of the heavy engine base and to utilize the usual magneto and water pump shaft and the space usually occupied by the same and thus economize space in the disposition of the pump.

Another object is to provide a pump, the movable parts of which are oiled by the splash from the main engine crank shaft chamber.

Another of the objects of the invention is to provide a simple and compact control between the pump and driving shaft whereby the pump is thrown into and out of operation and still a further object is to provide a pump, the parts of which may be conveniently demounted for repairs.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

In the accompanying drawings:

Figure 1 illustrates a preferred embodiment of my invention with the pump shown in vertical longitudinal section and certain coacting parts shown fragmentary in side elevation; and Fig. 2 is a plan view of the top portion of the pump casing showing the gear shifting lever.

As illustrated, the reference character 1 indicates the magneto, 2 indicates a portion of the water pump and 3 indicates the connecting pump and magneto shaft usual in automobile engine construction.

An extension from the engine base is formed into a hollow base casing 4 constituting an oil well and open to the main engine crank shaft chamber. The shaft 3 extends through the casing and is journaled in suitable packing boxes 4ª mounted in opposite walls of the same. A base plate 5 in the form of an open frame has outlining sides resting on the top edge of the casing 4, one of which sides is recessed to form a seat 6 for the outer pump-shaft bushing 7. A rib 8 parallels the recessed side, connects opposite sides of the plate 5 and is also recessed to form a pocket 9 for the inner bushing 10.

A bonnet form of pump body 11 has an outwardly extending bottom flange 12 which rests on top of the base plate and is removably affixed thereto by suitable means, such as the bolts 13 which pass through the flange and base plate and are threaded into the casing. The body 11 includes a relatively flat horizontally disposed crank containing casing 14 and a vertically extending pump cylinder 15 extending upward from one end thereof. The casing 14 is divided by a depending web 16 offset from the cylinder, the lower edge of which web is formed into a bearing 17 coacting with the pocket 9 to surround the bushing 10. The underside of the flange 12 at one end of the body is recessed and coacts with the seat to inclose the bushing 7. A pump shaft 18 is mounted in the bushings 7 and 10 and is locked in place by the end screw 19. The inner end of the shaft 18 is formed into a crank 20, the pin 21 of which carries a bearing sleeve 22 which sleeve in turn is mounted within the lower end of the connecting rod 23, the upper end of which is connected to the transverse piston pin 24. The piston pin has its opposite ends freely mounted within the pump piston 25 reciprocally mounted within the cylinder 15. The pump cylinder has air inlets 26 and an outlet 27 normally closed by the ball valve 28 maintained in closed position by the spring pressed plunger 29 as is usual with pump check valves.

The compressed air from the pump is conveyed to the tires or other suitable reservoir (not shown) through the conduit 30.

To drive the shaft 18 from the main shaft 3 a driving clutch is provided which includes a gear wheel 31 fixed to the shaft 3 and adapted to mesh with the gear wheel 32 suitably fixed to the shaft 18 as by means of the spline 33. The gear wheel 32 has a peripheral groove 34 containing a shifting pin 35 depending from the eccentric 36 rotatably mounted in the top of the casing 14. A manually actuated engagement lever 37 is fixed to the eccentric 36 and the lever is locked in position to maintain the clutch formed by gears 31 and 32 in either a meshing or a disengaged position, by means of a spring pressed ball 38 housed within an extension 39 from the lever and adapted to seat in one of the recesses 40 in the top face of the casing 14. Oil conduits 41 lead to and from the several packing boxes and bushings to lubricate the same with the oil splashed from the casing 4 and from the engine crank shaft chamber.

In operation, it will be understood that the clutch is normally in an inoperative position and the shaft is free to rotate. When it is desired to actuate the pump the lever 37 is moved into its position to shift the gear wheels into engagement with each other and the device is allowed to operate until the desired amount of air has been compressed, after which the lever is moved into its normal gear disengaging position.

By means of a construction of this character it is possible to provide a pump which is in effect a solid portion of the engine so that this member may have its requisite rigidity without an excessive addition of metal for this purpose and accordingly minimizes the amount of space necessary for a device of this character. The pump is conveniently located between the magneto and water pump utilizing this heretofore wasted space and there is provided an arrangement whereby the power is taken directly off the magneto shaft without the necessity of extra shafting to drive the pump. The bottom casing, base plate and pump body constitute a hollow built up structure inclosing the mechanism within a compartment open to the engine crank shaft chamber. The driving gear on the magneto shafts acts as an oil splash in addition to the splash from the engine crank shaft cylinder for lubricating the gears and gear shifting mechanism and provides a means for conveniently lubricating the several bearings.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination with a relatively short shaft designed to connect the magneto directly with a water pump, of a casing forming an extension from the engine base and containing practically all of said shaft whereby a relatively large casing may be disposed to occupy practically all of the small space between the magneto and water pump, a base plate carried by said casing, a pump body carried by said base plate and including a pump cylinder, a pump crank shaft journaled between the pump body and base plate and removable therewith, means for fastening said pump body and base plate to the casing, a pump piston in said cylinder actuated from said crank shaft and a clutch connection between said magneto and water pump shaft and said pump crank shaft.

2. In an automobile construction, the combination with a casing constituting an extension from an engine base, a shaft journaled in said casing, projecting beyond opposite sides thereof and adapted to connect a magneto with a water pump, of an air pump carried by said casing including an acting shaft paralleling the first named shaft, a driving clutch connection between said shafts and manually actuated means for moving said clutch into and from its operative position.

3. In an automobile construction, the combination with a shaft opposite ends of which are provided with means for connecting the same with a magneto and water pump, of an air pump including an actuating shaft paralleling the first named shaft, a driving clutch connection between said shafts, manually actuated means for moving said clutch into and from its operative position and means coacting with said manually actuated means for automatically locking said clutch in position.

4. In a device of the class described, the combination of an engine base forming part of the automobile engine, a driving shaft mounted in said base, an air pump removably supported from said base, means for fastening said pump to the base whereby the engine and the pump will constitute a built up unit and means for operatively connecting the pump with said driving shaft.

5. In combination with an extension from an engine base constituting a crank shaft chamber and a shaft mounted in said chamber and driven from the engine, of a casing open to said chamber and including an air pump cylinder, a pump shaft mounted in said casing and removable therewith as a unit, a piston reciprocating in said cylinder and operatively connected to said shaft, said pump shafts and piston being lubricated from said crank shaft chamber and a clutch connection between said shafts.

Signed at Detroit, in the county of Wayne and State of Mich., this 9th day of July, A. D. 1914.

JOHN G. PERRIN.

Witnesses:
O. E. DISTIN,
H. C. THOMPSON.